Nov. 25, 1947.      E. T. GREGORIE ET AL      2,431,641
HEADLAMP CONSTRUCTION
Filed June 18, 1945      2 Sheets-Sheet 1
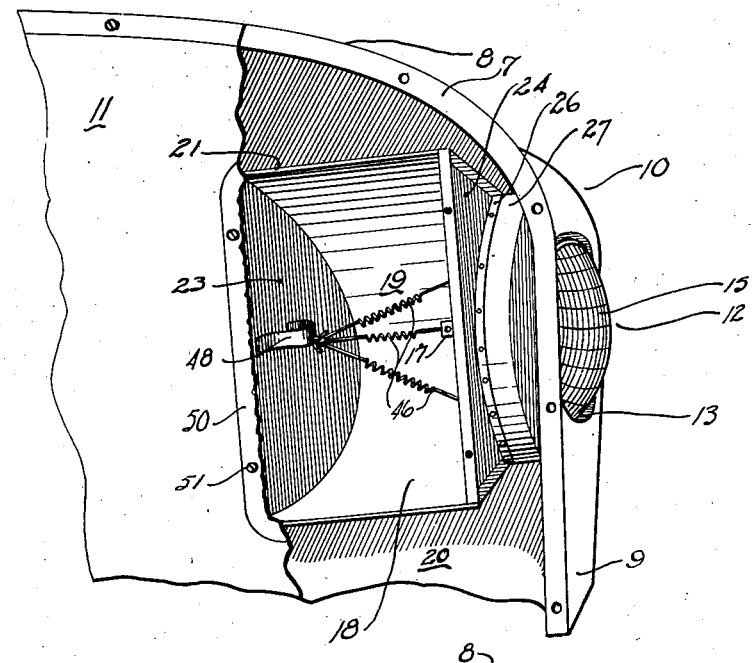
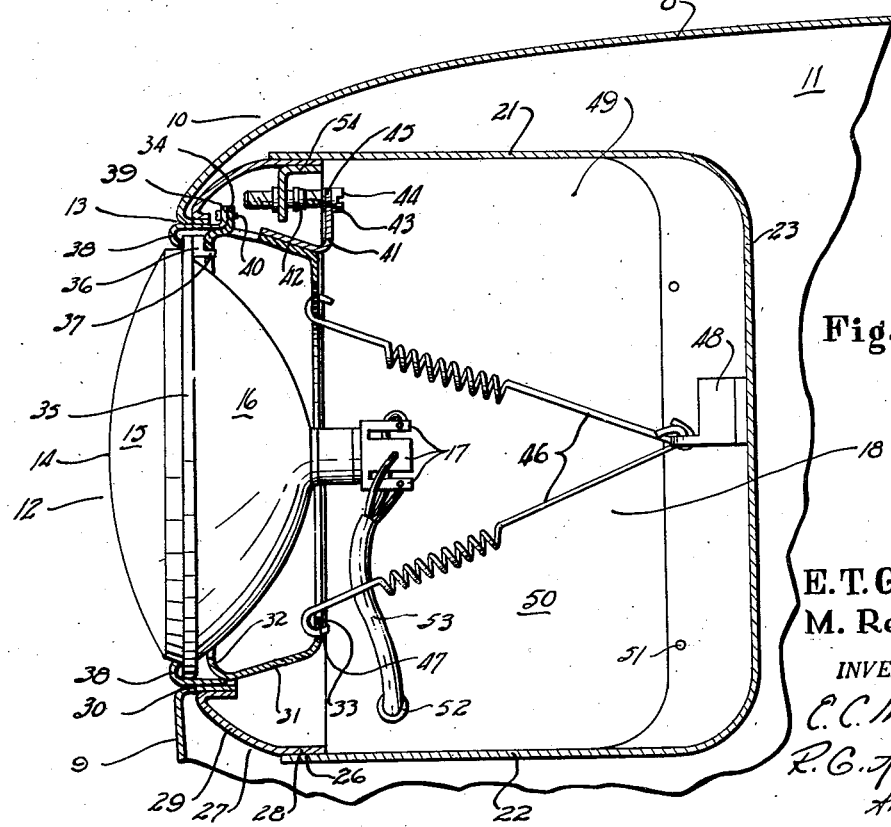
E. T. Gregorie
M. Regitko
INVENTORS E. T. Gregorie
M. Regitko
INVENTORS Patented Nov. 25, 1947

2,431,641

UNITED STATES PATENT OFFICE 2,431,641

HEADLAMP CONSTRUCTION

Eugene T. Gregorie, Grosse Ile, and Martin Regitko, Detroit, Mich., assignors to Ford Motor Company, Dearborn, Mich., a corporation of Delaware Application June 18, 1945, Serial No. 600,120

3 Claims. (Cl. 240—8.1)

This invention relates to construction of automotive bodies; and, more particularly, to a head lamp mounting for use with the sealed beam type of lamp.

The use of sealed beam head lamp units—that is, an integral lamp, lens and reflector assembly—has become practically universal in automotive construction, at least in this country. Since the unit is mounted and adjusted bodily on the vehicle, it has been the customary practice to provide an aperture in the front of each fender in which the lamp unit may be inserted and to provide a bowl-shaped housing within the fender behind the aperture having its edges secured to the fender around the aperture to protect the lamp and installation from material thrown up by the adjacent wheel. Combined with the housing and fender are mounting means to engage the lamp unit to facilitate its precise adjustment so that the projected beam may be carefully controlled. Finally, a bezel fits over the outer surface of the fender extending from the rim of the lamp lens beyond the edge of the aperture to give a neat and finished appearance to the lamp mounting, and to cover and protect the mounting mechanism. As an example of this prior type of mounting, attention is directed to United States Patents 2,219,143 to Wharam, or 2,293,222 to Sheldrick et al. showing various forms.

However, this type of mounting has several marked disadvantages. In the first place, the masking bezel must be quite wide to cover the adjusting collar or other mechanism surrounding the lamp unit. In many cases the designer may wish to avoid placing undue emphasis on the head lamp, and prefer to concentrate it on the radiator grill located centrally on the vehicle. He therefore desires to keep the apparent diameter of the lamps—which are usually placed at the extreme sides of the front of the vehicle—as small as possible. Moreover, the bezel must fit tightly against the adjoining fender surface and this imposes limitations upon the types of curve and the position which the head lamp may occupy on the fender. Naturally, it is desirable to have either a plane or a spherical surface adjoining the bezel, if this be possible, to permit more secure seating but such a surface may rarely fit in with the fender contour which the designer contemplates. Another disadvantage inherent in the conventional form of lamp mounting is that the wiring leading to the lamp is exposed between the bowl housing and the main harness in the motor compartment, and is subject to damage by debris thrown against it by the wheel or by the accumulation of ice and snow forming within the fender itself.

The essence of the present invention is that, instead of mounting the lamp externally, it is treated as an internally disposed unit. A separate, completely closed housing within each fender is provided in which the lamp is mounted and all the adjustments are made with reference to the internal housing structure rather than to the outer fender surface. It is thus possible to do away with the bezel overlying the fender entirely, and since the adjusting and mounting structure is disposed internally, only the lens of the lamp itself need be visible from the exterior. The opening in the fender for the lamp may be completely and securely sealed from the interior of the fender and leakage around the edge can be avoided. Further, the wiring leading to the lamp is entirely contained within the housing between the lamp and the engine compartment and hence is not exposed to damage within the fender. Following this construction it is possible to obtain a neater and smaller appearing head lamp with the standard lamp unit while providing full protection for the mounting and adjustment means and securing against tampering or removal of the lamp unit from the exterior of the vehicle.

With this and other objects in view, the invention consists of a structure described in the specifications, claimed in the claims and illustrated in the accompanying drawings, in which:

Fig. 1 is a perspective view of the front, upper portion of the left-hand fender of an automobile as it extends outwardly from the engine compartment, a portion of the engine compartment wall being broken away to show the internal disposition of the lamp housing.

Fig. 2 is a transverse vertical section of the lamp housing taken substantially as indicated by the line 2—2 on Figure 3.

Figure 3:
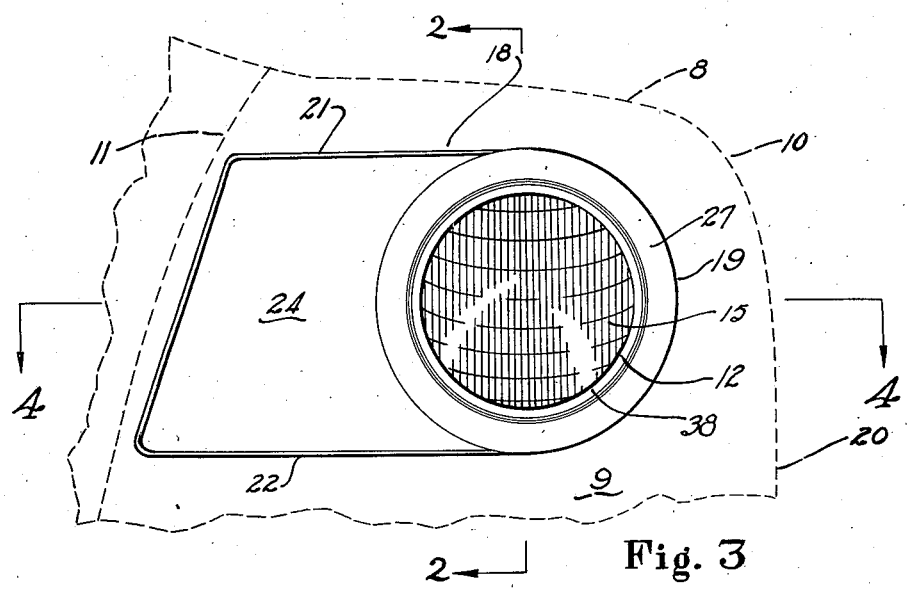
Fig. 3 is a front elevation of the assembled lamp housing and lamp, its relative location in the vehicle being indicated by the dotted outline of the fender.
Figure 4:
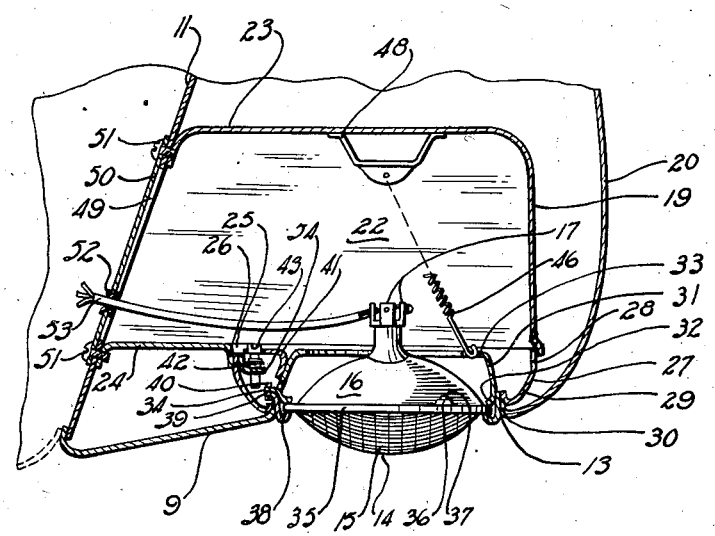
Fig. 4 is a horizontal sectional plan view taken substantially as indicated by the line 4—4 of Figure 3.

Referring first to Figure 1, the usual type of body construction is shown in which a fender 10 having the outer skirt 20, front 9, and top 8, is secured along its inner edge 7 to the top of the engine compartment panel 11. Normally, a radiator grill member then extends around the front inner edge of one fender across the front of the vehicle to the corresponding edge of the opposite fender. The head lamp 12 is mounted in an aperture 13 in the front surface 9 of the fender 10 and comprises, basically, a sealed beam unit 14 having a lens 15, a reflector 16, and the contact 17.

The particular mounting used comprises a more or less oblong housing 18 permanently secured at its inner open end to the engine compartment panel 11 and having its outer closed end 19 (which is substantially cylindrical in section) spaced slightly inwardly from the outer skirt 20 of the fender 10. The housing 18 has a substantially flat top 21 (spaced beneath the fender top 8), bottom 22, back 23, and front 24, (set back slightly from the fender front 9), the last-named being formed with an aperture 25 substantially aligned with the aperture 13 in the fender, though of much larger diameter and having an outwardly extending flange 26. A sleeve 27 with an inner cylindrical section 28 secured to the flange 26 extends through an outer frusto-conical section 29 to engagement with an inturned flange 30 formed in the fender front 9 surrounding the aperture 13. The sleeve 27 is securely welded at each end to the flanges 26 and 30 serving both as a support for the inner end of the housing 18, as a water tight passage between the aperture 13 and the inner housing 18, and as a support and protection for the mounting and adjusting means for the lamp 12.

The lamp mounting comprises a ring-shaped member 31 having inturned flanges 32 and 33 at its front and rear ends, and a number of ears 34 struck out adjacent to the front flange. The lamp 12 has a metal flange 35 secured at its rear face to the reflector 16 and having its front edge spun over the lens 15. Secured to the rear face of the flange 35 are spacers 36 adapted to bear against the outer face of the ring flange 32 and associated key lugs 37 adapted to fit in cut-out portions in the flange 32 to orient the lamp properly so that the dual beam filaments are in correct relationship. A lamp bezel 38 fits over the front face of the flange 35 and has ears 39 which may be bolted as at 40 to the ears 34 on the ring 31. Thus assembled, the lamp, ring, and lamp bezel may be inserted in the housing through the open inner end corresponding with the opening 49 in the panel 11, and positioned in the sleeve 27 so that the lens 15 projects through the aperture 13. It will be noted that the lamp bezel 38 does not extend over the edge of the aperture 13 but rather between the lamp 12 and the flange 30.

The unit is secured and adjusted in place by means of the two angles 41 welded at 90° spacing to the ring 31 at the top and at one side thereof to give the necessary horizontal and vertical components for adjustment, and similarly disposed angles 54 similarly welded to the sleeve 27. The actual adjustment is accomplished by means of a nut 42 anchored in each angle 54 and a bolt 43 having a head 44 rotatably mounted in a slot 45 in each angle 41. By suitable adjustment of the bolts 43, the desired alignment of the lamp mounting can be obtained and permanently secured. Three springs 46 extend from spaced apertures in the rear flange 33 to a bracket 48 secured on the rear wall 23 of the housing resiliently urging the lamp mounting and lamp into position against the forces imposed by the adjusting bolts 43.

As is noted above, the open end of the housing 18 is permanently secured to the engine compartment panel 11 which also has an opening 49 giving access to the interior of the housing. This opening would normally be between the radiator and the radiator grill and access to it may be had by raising the vehicle hood. Through it the lamp and its associated mounting may be inserted to and through the sleeve 31; the adjusting bolts 43 engaged in the open slots 45; the springs 46 running from the flange 33 affixed to the bracket 48; and the bolts 43 adjusted to obtain the desired alignment. Thereafter, the opening 49 is closed by a plate 50 held in place by self-tapping screws 51 or other similar means to complete an enclosure of the housing.

The plate 50 has a grommet 52 through which passes the cable 53 running from the vehicle harness to the terminals 17 on the lamp 12. Thus the balance of the cable is fully protected from contact with debris thrown up by the wheel or by damage from the accumulation of snow or ice. When the plate 50 is removed to gain access to the housing, the cable still remains in place, the plate 50 sliding freely along it. Of course, it will be understood that access through the interior of the housing 18 is had by raising the vehicle hood and then removing the plate 50 on from the engine compartment panel 11. Since the hood is normally locked from within the vehicle, it is impossible to gain access to the lamp or its adjustment when the vehicle is closed and locked.

The advantages in the construction are believed to be self-evident. Apart from the design feature by means of which the apparent size of the lamp may be diminished by avoiding the use of a bezel overlying any portion of the fender and the fact that the contour of the fender in the immediate vicinity of the lamp is not limited by the requirement of the bezel, a further structural advantage is that the lamp and mounting are entirely enclosed, and the adjusting mechanism is fully protected from the elements or tampering from the outside. The entire structure is much more rigid than those formerly used depending merely upon the fender for support, since the housing acts as a stiffening strut leading from the engine compartment panel and strongly reinforcing the fender in the vicinity in which the lamp is placed. This increased strength insures that the lamp will remain in adjustment for longer periods of time and that it will not readily be disturbed. The cable is entirely protected, and the adjusting mechanism is shielded from dirt and road material although readily available whenever such access may be required.

It is realized that certain changes may be made in the detailed construction shown, but it is the purpose to cover by the claims such modifications therein as may reasonably be within the scope thereof.

The invention claimed is:

1. In an automotive body construction, an engine compartment having a substantially vertically extending panel, a front fender secured adjacent thereto, said fender and panel together forming a front wheelhousing, a lamp housing extending transversely of said vehicle from an opening in said engine compartment to adjacent the outer skirt of said fender, an aperture formed in the front face of said fender adapted to receive a sealed beam lamp unit, said lamp housing including means extending from said transversely extending portion to said aperture and secured therebetween, a lamp unit mounted within said aperture, the securing means therefor being secured within said extension of said lamp housing, a removable closure for said opening in said engine compartment, the interior of said lamp housing being sealed from said wheelhousing.

2. In an automotive body construction, an engine compartment having a substantially vertically extending side panel, a front fender having its inner edge secured to said panel and terminating outwardly therefrom in a depending skirt, an aperture in the front face of said fender adapted to receive a sealed beam lamp unit, said aperture having an inwardly extending flange, a housing having an inner open end secured to said compartment panel and extending outward therefrom with a closed outer end adjacent the skirt of said fender, an opening in said housing substantially aligned with the aperture in said fender, a sleeve extending between said housing and said flange, a lamp unit insertable from said housing through said sleeve into said aperture, and adjustable means within said housing rearwardly of said lamp unit to secure adjustably said lamp in position in said aperture, said means comprising adjusting screws having their heads extending rearwardly and accessible from the interior of said housing.

3. In a body construction, an engine compartment, a front fender having depending skirt and front faces, a side panel defining said compartment, said panel and fender defining a wheelhousing, a box-like lamp housing within said fender having one open end fixedly secured to and opening through said panel and extending transversely of the vehicle therefrom to a closed outer end adjacent said skirt face, an aperture in said fender face, an aligned aperture in said lamp housing, a sealing sleeve extending between the outer part of said lamp housing and said fender enclosing said aperture, the interior of said lamp housing being sealed from said wheelhousing.

EUGENE T. GREGORIE.
MARTIN REGITKO.

REFERENCES CITED

The following references are of record in the file of this patent:

UNITED STATES PATENTS

| Number | Name | Date |
|---|---|---|
| 2,312,005 | Smith | Feb. 23, 1943 |
| 2,338,541 | Roedding | Jan. 4, 1944 |
| 1,978,293 | Burney | Oct. 23, 1934 |
| 2,086,172 | Northup | July 6, 1937 |